No. 879,990. PATENTED FEB. 25, 1908.
W. H. WARNER, Jr.
TRAP NEST.
APPLICATION FILED MAR. 18, 1907.
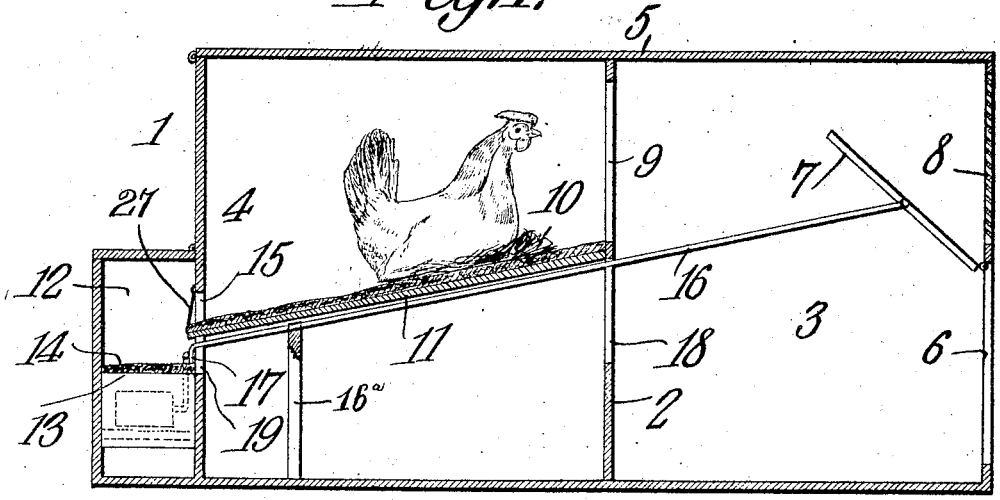
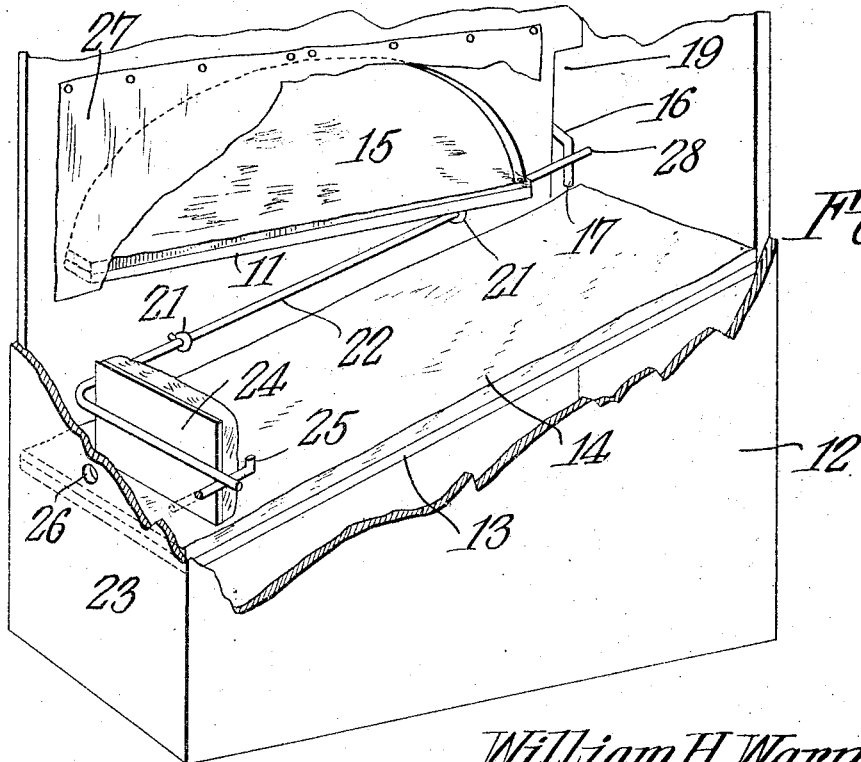
William H. Warner, Jr.,
INVENTOR.
WITNESSES:
By C. A. Snow & Co.
ATTORNEYS

UNITED STATES PATENT OFFICE.

WILLIAM H. WARNER, JR., OF ALLEGAN, MICHIGAN

TRAP-NEST.

No. 879,990.

Specification of Letters Patent.

Patented Feb. 25, 1908.

Application filed March 18, 1907. Serial No. 363,058.

*To all whom it may concern:*

Be it known that I, WILLIAM H. WARNER, Jr., a citizen of the United States, residing at Allegan, in the county of Allegan and State of Michigan, have invented a new and useful Trap-Nest, of which the following is a specification.

This invention relates to trap nests for fowls, wherein means are provided for operating automatically the entrance door, as soon as an egg has been laid by a fowl sitting on the nest; and the main object of the invention is to provide the nest with such simple mechanism that when the entrance door is opened and held open by suitable tripping mechanism, it will remain in that position until a fowl on the nest lays an egg, which latter, will immediately roll down suitably inclined surfaces, padded to prevent the egg from breaking, and striking the padded abutting plate will operate the trip mechanism and cause the door to fall, imprisoning the fowl which remains inclosed within the nest box until released by the person in charge.

With this and other objects in view the invention consists of the novel construction, combination and arrangement of parts hereinafter described and definitely claimed.

In the accompanying drawings: Figure 1 is a longitudinal vertical sectional view of the improved trap nest. Fig. 2 is a perspective view of one end of the trap nest partly broken away, to show more clearly the tripping mechanism.

Similar numerals of reference indicate corresponding parts in the several figures.

In trap nests of this type it has been deemed advisable to provide certain devices by means of which the entrance door is held open until an egg has been laid, and then to cause the latter to operate the trip mechanism whereby the door is closed and the fowl laying the egg held a prisoner until released.
The fowl may enter through the open door and even get on the nest and remain there indefinitely without causing the door to be closed unless an egg has been laid. By thus arranging the tripping mechanism, a double purpose is served. In the first place, a fowl may enter the trap box and get on the nest, and, being dissatisfied with it or her surroundings as is often the case she can leave the nest and seek another; and in the second place, when the person in charge sees a trap nest with a closed door he knows that an egg has been laid and the fowl which laid the egg is imprisoned within the box. When the box is opened to get the egg and release the fowl it is absolutely known that the egg taken out was laid by the particular fowl released and can be identified, an important fact to breeders of high class fowls.

In the trap nest shown in the drawing the numeral 1 indicates a box provided with a partition 2 about midway of its length, this partition divides the box into two sections or rooms, the entrance room 3 and the nest room 4, a lid 5 is pivoted to the box so that it may be readily opened to release the fowl held therein. The entrance to the trap nest is provided with an opening 6 which may be closed by a swinging door 7, a slatted window 8 is placed in the front of the box above the door opening for the admission of air and to temper the light entering the box through said window. The upper part of the partition 2 is provided with an opening 9 of sufficient size to permit the fowl to pass therethrough onto the nest 10 placed at the upper end of an inclined runway 11, having its upper surface padded or otherwise prepared to permit an egg to roll thereon without breaking.

The main box 1 of the trap nest is made with vertical side and end walls and a flat bottom, the top may also be flat and parallel to the bottom, inclined or placed in any other position desired. On the rear of the box 1 is placed an extension 12 which resembles a small box half the height of the trap nest and having a length equal to the width thereof. Within the extension 12 is placed an inclined platform 13 padded at 14 and upon which the egg falls and rolls down to operate the trip mechanism. Through the rear of the box 1 is an opening 15 leading into the extension 12 through which the lower end of the runway 11 projects. Through this opening 15 the egg passes as soon as it is laid and falls onto the padded incline 13.

Pivoted to one side of the door 7 is a rod 16 which extends rearwardly and terminates just within the extension 12 where it is provided with an offset 17 formed, for instance, by bending the end of the wire into any shape desired. The central partition 2 and the rear of the box 1 are provided with vertical slots 18 and 19 through which said wire passes and which is upheld by a small support 16ª at its free end. Within the extension 12 and attached to the rear wall of the trap nest beneath the projecting end of the runway 11, are guides 21 through which extends a trip rod 22. The upper end of said rod 22 is adapted to slide behind the offset 17 on the rod 16 to prevent it from moving longitudinally in a rearward direction by the weight of the uplifted door 7. The lower end of the trip rod 22 has attached to it near the end wall 23 of the extension 12 an abutting plate 24, its outer end being supported on a pin 25 projecting from the wall 23 to hold the bottom of the abutting plate 24 just above the padded surface 14 of the inclined platform 13. A hole 28 is made through the wall 23 just behind the abutting plate 24, by means of which the trap is set. A curtain 27 is tacked to the rear wall of the trap box 1 within the extension 12 to cover the opening 15 and in a measure retard the speed of the egg just before it falls onto the inclined platform 13.

The trap is set by swinging the door 7 inwardly on its hinges to some point above the horizontal in order that the rod 16 will have a tendency to move rearwardly when the door is released. After the door has been raised a small stick, nail or anything small enough is pushed through the hole 26 in the wall 23 of the extension and striking the abutting plate 24 slides the trip rod 22 in its bearings until its upper end 28 passing behind the finger 17 on the rod 16, thus retaining the door 7 in elevated position. As soon as the fowl has laid an egg the latter rolls down the runway 11, drops onto the padded surface of the inclined platform 13 and rolling downwardly thereon it strikes the padded abutting plate 24 with sufficient force to cause the trip rod 22 to be disengaged from the finger 17; the rod 16 being now free, the door 7 falls by gravity and closes the opening 6 through which the fowl entered.

Having thus described the invention what is claimed is:—

1. A trap nest having a hinged door, an inclined runway composed of two parts at an angle to each other and forming a continuous passage for the newly laid egg, a rod extending from the door when fully opened to the rear end of the higher runway, a sliding abutment near the end of the lower runway, and a trip means connected to said abutment adapted to engage said rod and hold the door open until a newly laid egg has moved the abutment and disengaged the trip means.

2. A trap nest having a hinged door, a rod pivotally connected to said door and extending to the rear of the nest, an inclined two part runway angularly disposed with relation to each other, the lower runway having a sliding abutment near its end and a support therefor, a trip rod attached to said runway and adapted to engage the end of said rod, whereby the door is caused to fall when a newly laid egg rolling down the runway strikes the abutment and disengages the rod.

3. A trap nest having a hinged door, a plurality of consecutive inclined surfaces forming a runway, a sliding abutment near the end of said runway, and a trip device between said abutment and the hinged door whereby the door is held open by the trip device when the abutment is moved forward, and permitted to drop when the abutment has been moved by a newly laid egg rolling down the runway causing the trip device to operate and permit the door to fall.

4. A trap nest, comprising a box having a central partition and an extension on the rear of said box, an inclined runway extending from said partition into the extension through an opening formed in the rear wall of said box, a second inclined runway within said extension, a hinged door for said trap nest, a rod extending from said door through the said extension, and a tripping device in said extension for engaging said rod to hold said door in open position.

5. A trap nest, provided with a hinged door and a rod extending therefrom to the rear of the nest, a sliding rod adapted to engage said first mentioned rod to hold the door in open position, an abutment on the lower end of said sliding rod, and an inclined runway extending from a nest to said abutment, and down which an egg newly laid by a fowl on said nest will roll and striking the abutment cause the door to close.

In testimony that I claim the foregoing as my own, I have hereto affixed my signature in the presence of two witnesses.

WILLIAM H. WARNER, Jr.

Witnesses:
WILLIAM W. WARNER,
H. D. PRITCHARD.